F. J. JOHANSSON & E. A. O. GÖTHE.
MILKING MACHINE.
APPLICATION FILED OCT. 21, 1913.
1,122,762. Patented Dec. 29, 1914.
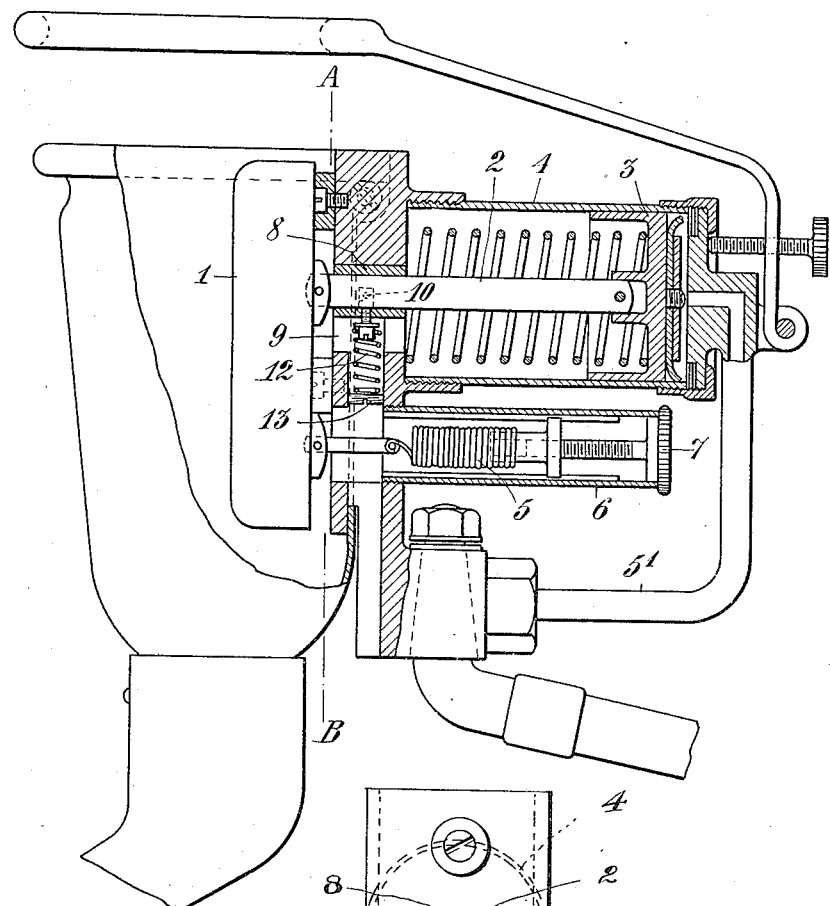
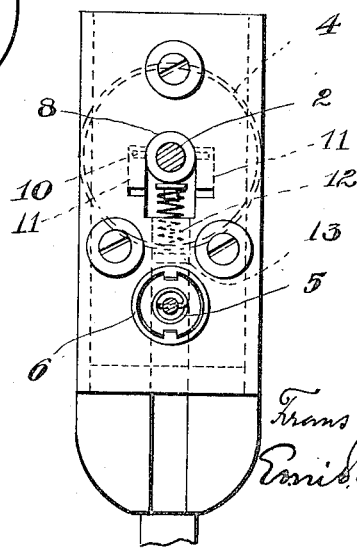
Witnesses
K. E. Wiberg
N. Perry
Inventors
Frans J. Johansson
Emil A. O. Göthe

UNITED STATES PATENT OFFICE.

FRANS J. JOHANSSON, OF STOCKHOLM, AND EMIL A. O. GÖTHE, OF NYNÄSHAMN, SWEDEN.

MILKING-MACHINE.

1,122,762. Specification of Letters Patent. Patented Dec. 29, 1914.

Application filed October 21, 1913. Serial No. 796,402.

*To all whom it may concern:*

Be it known that we, FRANS JOSEF JOHANSSON and EMIL ALBERT OLSSON GÖTHE, subjects of the King of Sweden, and residents of Stockholm and Nynäshamn, Sweden, respectively, have invented new and useful Improvements in Milking-Machines, of which the following is a specification, reference being had to the drawings accompanying and forming part hereof.

Our invention relates to improvements in milking machines of the class in which the member of the teat cup actuating the teat consists of a plate or the like adapted to be moved in such manner that first the upper edge of the plate is pressed against the root of the teat or near to said root, the plate then, when resting with said edge against the teat, being swung against the same to compress it. In case the member moving the plate in this manner toward the teat be guided in a stationary part, the upper edge of the plate will move upward when the plate is swung. This upward movement counteracts the flow of the milk from the teat.

The object of our invention is to prevent said upward movement, so that the edge of the plate first pressed against the teat will remain stationary during the swinging movement of the plate.

The invention is mainly characterized by this that the guide of the part or parts moving the plate toward the teat is movable in such manner that the said guide when the plate is pressed at its upper edge against the teat and then swung about said edge, is acted upon by the pressure exerted at the edge of the plate and, on account thereof, moved in or approximately in the longitudinal direction of the plate, so that the edge of the plate first pressed against the teat does not move along the same during the swinging movement of the plate.

A suitable embodiment of the invention is illustrated in the accompanying drawing in which—

Figure 1 shows a sectional side view of a teat cup arranged according to the present invention and Fig. 2 same parts in section through the line A—B of Fig. 1.

The teat cup shown in the drawings belongs to that class of milking machines which are driven by means of air pressure. The member of the teat cup actuating the teat consists in a plate 1 coated with cork, rubber or the like and fulcrumed on a rod 2 which is movably connected to a piston 3 adapted to reciprocate in a cylinder 4 into which pressure air is introduced through the conduit $5^1$. Attached near to the lower end of the plate 1 is a spring 5 located in a socket 6 and connected to a thumb screw 7 screwed into the outer end of the socket 6 and serving to adjust the tension of the spring 5. The piston 3, when moved inward in the cylinder 4 by the pressure air, acts through the medium of the rod 2 to swing the plate 1 the lower part of which is retarded by the spring 5, so that the upper edge of the plate is first swung onto the teat. When the piston 3 is then moved farther in the cylinder 4 the plate swings against the teat. The upper edge of the plate would thereby, as mentioned above, move upward, if not the following measures were taken according to the present invention. The rod 2 reciprocating together with the piston 3 is surrounded by a socket 8 adapted to move up and down in an aperture 9 in the stationary part of the teat cup construction and at the same time to swing about pivots 10 attached to the socket 8 and adapted to swing as well as to move in notches 11. The socket is supported by a spring 12 resting against a screw-plug 13 and keeping the socket in its uppermost position, *i. e.* the initial position. When the plate, being moved toward the teat, first presses its upper edge against the same and then is swung about said edge, the socket 8 counteracting the spring 12 is moved downward during said swinging movement, on account whereof the rod 2 as well as the plate 1 also move downward, the edge of the plate thereby remaining at the point of pressure.

The present invention may be performed in other manners than those shown in the drawing. The principle of the invention consists, however, in this that the plate 1 or its guide may be allowed to move downward during the swinging movement of the plate, and that the plate, when swung back from the teat, may return to its initial position. The spring, or the like, necessary for said returning movement may be inserted in different manners between the plate or the rod supporting the same and a stationary part of the teat cup construction.

We claim:

1. In a milking machine the combination of a plate the upper edge of which is arranged to press against the teat, means for swinging the plate against the teat and a guide for said means, said guide being movable downward during the swinging movement of the plate.

2. In a milking machine, the combination of a plate the upper edge of which is arranged to press against the teat, a reciprocating rod for swinging the plate against the teat, and a guide for said rod, said guide being movable downward during the swinging movement of the plate.

3. In a milking machine, the combination of a plate the upper edge of which is arranged to press against the teat, a reciprocating rod for swinging the plate against the teat, and a socket serving as guide for said rod, said guide being movable downward during the swinging movement of the plate.

4. In a milking machine, the combination of a plate the upper edge of which is arranged to press against the teat, a reciprocating rod for swinging the plate against the teat, a socket serving as guide for said rod and a spring acting to keep the guide in its initial position, said guide being movable downward during the swinging movement of the plate.

5. In a milking machine, the combination of a plate the upper edge of which is arranged to press against the teat, a reciprocating rod arranged to swing the plate against the teat, a socket serving as guide for said rod and movable downward at right angles to the longitudinal direction thereof, and a spring acting to keep the guide in its initial position.

6. In a milking machine, the combination of a plate the upper edge of which is arranged to press against the teat, a reciprocating rod for swinging the plate against the teat, said rod being movably connected to the plate, a socket serving as guide for said rod and movable downward at right angles to the longitudinal direction thereof, a spring acting to keep the guide in its initial position, and a spring connected to the lower part of the plate and adapted to allow its movement toward the teat.

FRANS J. JOHANSSON.
EMIL A. O. GÖTHE.

Witnesses:
K. E. WIBORG,
N. PERRY.

Copies of this patent may be obtained for five cents each, by addressing the "Commissioner of Patents Washington. D. C."